United States Patent [19]

Bacskai

[11] Patent Number: 4,820,786

[45] Date of Patent: Apr. 11, 1989

[54] PROCESS FOR THE PREPARATION OF LINEAR LOW DENSITY POLYETHYLENE

[75] Inventor: Robert Bacskai, Kensington, Calif.

[73] Assignee: Chevron Research Company, San Francisco, Calif.

[21] Appl. No.: 909,136

[22] Filed: Sep. 18, 1986

Related U.S. Application Data

[63] Continuation-in-part of Ser. No. 527,625, Aug. 29, 1983, abandoned.

[51] Int. Cl.$^4$ .................. C08F 210/08; C08F 4/02; C08F 4/64
[52] U.S. Cl. ........................... 526/152; 526/151; 526/142; 526/348.6
[58] Field of Search ............... 526/151, 152, 348.6, 526/142

[56] References Cited

U.S. PATENT DOCUMENTS 4,383,938  5/1983  Langer ..................... 526/151

Primary Examiner—Paul R. Michl
Assistant Examiner—Mark R. Buscher
Attorney, Agent, or Firm—S. R. La Paglia; R. C. Gaffney; C. J. Caroli

[57] ABSTRACT

A process for the preparation of linear low density polyethylene by the copolymerization of ethylene and 1-butene which comprises contacting ethylene with a feedstock comprising 1-butene in the presence of a catalyst comprising:
  (a) a solid supported titanium tetrahalide complex, wherein said complex is prepared by contacting a mechanically pulverized solid support with titanium tetrahalide in the absence of mechanical pulverization, and
  (b) a cocatalyst comprising a mixture of dialkyl aluminum halide and a dialkyl magnesium or alkyl lithium compound.

15 Claims, No Drawings

PROCESS FOR THE PREPARATION OF LINEAR LOW DENSITY POLYETHYLENE

CROSS-REFERENCE TO RELATED APPLICATION

This application is a continuation-in-part of Application Ser. No. 527,625, filed Aug. 29, 1983, now abandoned.

BACKGROUND OF THE INVENTION

The present invention relates to a process for the preparation of linear low density polyethylene. More particularly, the present invention relates to the copolymerization of ethylene and 1-butene using a catalyst system comprising a titanium-containing component and a second component comprising a mixture of a dialkyl aluminum halide and a dialkyl magnesium or alkyl lithium compound.

Linear low density polyethylene, or LLDPE, is a solid branched copolymer of ethylene and 1-butene, wherein the 1-butene content is about 4 to 8% of the total copolymer. This copolymer is conventionally prepared by the Ziegler-catalyzed reaction of essentially pure 1-butene with ethylene in a saturated hydrocarbon solvent.

It is known in the art that extremely reactive Ziegler-type catalysts can be prepared by reacting titanium tetrachloride with ethanol in the presence of a pulverized solid support, such as magnesium chloride. Frequently, esters of aromatic carboxylic acids are included in this preparation. The resulting solid complex is then mixed with a trialkyl aluminum compound, such as tri-isobutyl aluminum, to produce the final catalyst. When used to polymerize alpha olefins, these catalysts provide high yields of stereoregular polymer per part of catalyst. As a result, the catalyst normally does not have to be separated from the polymer to give a final polymer product of specification purity.

Accordingly, U.S. Pat. No. 4,143,223 describes an alpha olefin polymerization or copolymerization process using a catalyst composition comprising a mechanically pulverized solid halogen-containing titanium catalyst component and an organoaluminum compound. The titanium catalyst component is obtained by reacting a titanium compound, such as titanium tetrachloride, with a pulverized solid product derived from a magnesium compound, an organic acid ester and an active hydrogen-containing compound selected from alcohols and phenols.

U.S. Pat. No. 4,107,415 describes an alpha olefin polymerization process using a catalyst system comprising a catalyst-forming component which is an addition and/or substitution product of an electron-doner compound (or Lewis base) and an alkyl aluminum compound, and a supported catalyst-forming component obtained by contacting a titanium compound with a carrier which is a mixture of an active magnesium or manganese dihalide and a solid organic material which is inert to all other catalyst components. The electron-doner compound is typically an organic acid ester and the inert solid organic material is a compound such as durene, anthracene, acenaphthene or diphenyl.

Chemical Abstracts, 96:69614c (1982) describes an alpha olefin polymerization catalyst comprising an organic aluminum compound, such as triethyl aluminum, and a solid component obtained by reacting milled mixtures of magnesium dichloride, aromatic carboxylic acid esters and silicon tetrachloride with titanium tetrahalide in the presence of chlorinated hydrocarbons, such as dichloroethane.

A major drawback of prior art processes for making LLDPE is the fact that conventional Ziegler-type catalysts are highly sensitive to impurities and thus require highly purified alpha olefin monomers for use in copolymerization. This is an important factor to consider when assessing the economics of LLDPE manufacture.

SUMMARY OF THE INVENTION

The present invention provides an improved process for the preparation of linear low density polyethylene by the copolymerization of ethylene and 1-butene which comprises contacting ethylene with a feedstock comprising 1-butene in the presence of a catalyst comprising (a) a solid supported titanium tetrahalide complex, wherein said complex is prepared by contacting a mechanically pulverized solid support with titanium tetrahalide in the absence of mechanical pulverization, and (b) a cocatalyst comprising a mixture of dialkyl aluminum halide and a dialkyl magnesium or alkyl lithium compound.

Among other factors, the present invention is based on my discovery that a mixed metal alkyl catalyst containing both a dialkyl aluminum halide and a dialkyl magnesium or alkyl lithium compound is extremely effective in copolymerizing ethylene and 1-butene to provide linear low density polyethylene in excellent yield. This is particularly surprising in view of the fact that alkyl aluminum halides, which are known to form active Ziegler catalysts, by themselves do not provide effective olefin polymerization catalysts when mixed with solid supported titanium complexes. Similarly, dialkyl magnesium or alkyl lithium compounds by themselves do not produce good polymerization catalysts when mixed with titanium complexes.

Equally surprising, in view of the prior art teaching, is the discovery that a mixture of trialkyl aluminum and dialkyl magnesium (or alkyl lithium) does not form an active polymerization catalyst with the supported titanium complex.

Furthermore, it has been found that other mixed metal alkyls, such as the mixture of dialkyl aluminum halide and alkyl zinc or the mixture of dialkyl aluminum halide and alkyl boron, also provide inactive polymerization catalysts.

A significant advantage of the present process lies in the discovery that highly purified 1-butene is not required for copolymerization. In fact, I have found that ethylene can be effectively copolymerized with the 1-butene contained in a refinery $C_4$ hydrocarbon stream to produce excellent LLDPE in very good yields, using the supported Ziegler-type catalysts described above. This is a surprising discovery since such $C_4$ hydrocarbon streams typically contain other unsaturated compounds and as much as 40% isobutene. Isobutene is known to preferentially polymerize to viscous oils or sticky solids in the presence of conventional Ziegler catalysts. Thus, it is unexpected that a $C_4$ hydrocarbon stream containing relatively impure 1-butene would be a suitable feedstock for LLDPE manufacture.

DETAILED DESCRIPTION OF THE INVENTION

The catalyst system used in the process of the present invention contains a solid supported titanium complex component and a cocatalyst component which comprises a mixture of a dialkyl aluminum halide and a dialkyl magnesium or alkyl lithium compound.

The titanium complex catalyst component may be any of the conventional solid titanium-containing complexes used in polymerizing alpha olefins, wherein the titanium is introduced into the complex without copulverization with the support. These titanium-containing catalyst components are well known in the art and are described, for example, in the aforementioned U.S. Pat. No. 4,143,223 and in Chemical Abstracts, 96:69614c (1982).

In general, the titanium complexes are obtained by contacting a titanium compound with a mechanically pulverized solid support, or carrier, in the absence of mechanical pulverization. Typically, the titanium compound will be a titanium tetrahalide, although other titanium compounds are suitable, such as alkoxytitanium halides. The preferred titanium compound is titanium tetrachloride.

The mechanically pulverized solid support will normally contain a magnesium compound, preferably a magnesium dihalide and more preferably, magnesium dichloride. Other magnesium compounds contemplated include alkoxy magnesium halides, aryloxy magnesium halides, and the like. Manganese dihalides may also be used in place of magnesium dihalides. The magnesium or manganese compounds should preferably be anhydrous.

Additionally, it is preferable to include a carboxylic acid ester in the final titanium complex. The carboxylic acid ester may be included as part of the pulverized solid support or it may be separately added to the titanium compound. Aromatic carboxylic acid esters are preferred, the most preferred being ethyl benzoate.

Other compounds have been variously described in the literature as useful in forming the titanium complexes. These compounds include alcohols such as ethanol; phenols such as cresol; and silicon tetrachloride. Often these compounds are introduced as part of the pulverized solid support.

The solid support may be mechanically pulverized in a ball mill, a vibratory mill, an impact mill, or the like, preferably under dry conditions in the absence of an inert diluent.

As used herein, the term "mechanically pulverized" or "mechanical pulverization" denotes pulverization which imparts a violent pulverizing effect to a material and excludes such means as mere mechanical stirring.

Suitable titanium complexes which are useful for forming the catalyst used in the present process include complexes comprising magnesium dichloride, ethyl benzoate, ethanol and titanium tetrachloride; complexes comprising magnesium dichloride, ethyl benzoate, cresol and titanium tetrachloride; and complexes comprising magnesium dichloride, ethyl benzoate, silicon tetrachloride and titanium tetrachloride.

The mixed metal alkyl component of the catalyst system of the present process comprises a mixture of a dialkyl aluminum halide and a dialkyl magnesium or alkyl lithium compound. The dialkyl aluminum halides which are suitable include dialkyl aluminum halides having the empirical formula: $AlR_2X$, where R is alkyl and X is halogen. Generally, the alkyl group will contain from 2 to 8 carbon atoms. Preferred dialkyl aluminum halides are the dialkyl aluminum chlorides. A preferred dialkyl aluminum chloride is diethyl aluminum chloride.

The dialkyl magnesium compounds suitable for use in the catalyst of the present process are those having alkyl groups of 2 to 8 carbon atoms. Representative examples include dioctyl magnesium. Similarly, the alkyl lithium compounds suitable for use contain alkyl groups of 2 to 8 carbon atoms. Representative lithium compounds include ethyl lithium, propyl lithium, octyl lithium, and the like. A preferred lithium compound is butyl lithium.

The mixture of the dialkyl aluminum halide and the dialkyl magnesium or alkyl lithium compound has an aluminum to magnesium (or lithium) molar ratio of 1:5 to 5:1, preferably about 2:1.

In accordance with the process of the present invention, ethylene is contacted with a feedstock comprising 1-butene. In general, the feedstock will comprise from about 5% to about 100% 1-butene. In a preferred embodiment of the present process, the butene-containing feedstock is a refinery $C_4$ hydrocarbon stream. This $C_4$ hydrocarbon stream will typically contain about 5 to 25% 1-butene, and about 5 to 40% 2-butene, 1 to 40% isobutene, 1 to 20% normal butane, 5 to 50% isobutane, 0.005 to 5% butadiene, and 0.1 to 10% $C_3$ and $C_5$ hydrocarbons. Refinery $C_4$ hydrocarbon streams which have been further processed, for example, to selectively remove isobutene, are also contemplated as suitable feedstocks.

The ethylene and 1-butene are copolymerized in contact with the present catalysts under conventional polymerization conditions. Copolymerization is conducted at temperatures ranging from about 0° C. to 100° C., preferably from about 20° C. to 90° C. Copolymerization pressure is generally about 10 to 2000 psi, preferably from about 50 to 800 psi. The reaction is normally carried out over a period of about 1 to 24 hours. The polymer is recovered by conventional techniques, such as filtration, and dries to a white, powdery solid product. Molecular weights are generally in excess of 100,000.

The reaction can be carried out either in the liquid or gaseous phase. When it is carried out in the liquid phase, an inert organic solvent can be used as a reaction medium or the olefin feedstocks can be used as the reaction medium. Examples of inert organic solvents include aliphatic hydrocarbons of 4 to 8 carbon atoms such as hexane or heptane; cycloaliphatic hydrocarbons such as cyclohexane; and aromatics such as benzene, toluene or xylene.

The regulation of the polymer molecular weight during the copolymerization is effected according to known techniques by operating, for instance, in the presence of hydrogen. The presence of hydrogen as a molecular weight modifier, operating with the catalysts of the present invention, does not appreciably reduce the activity of the catalysts.

The copolymerization can be carried out by any of batchwise, semi-continuous or continuous methods. It is also possible to perform the polymerization in two or more stages under different reaction conditions.

The following examples are provided to illustrate the invention in accordance with the principles of the invention but are not to be construed as limiting the invention in any way except as indicated by the appended claims.

EXAMPLES

Abbreviations used in the following examples include "Et" for ethyl, "Bu" for butyl, and "i-Bu" for isobutyl.

Example 1

TABLE I

Synthesis of LLDPE (Ethylene/1-Butene Copolymer) From Ethylene and Refinery $C_4$

| Example No. | Refinery $C_4$ g | $Ti^a$ mg | $Ti^a$ mM | $MgBu_2$ mM | Time hours | Temperature °C. | Pressure$^b$ psi | Yield g | Yield g/Ti | Density, g/cc |
|---|---|---|---|---|---|---|---|---|---|---|
| $AlEt_2Cl$ | | | | | | | | | | |
| 1 | 300 | 2.16 | 5.6 | 2.8 | 0.33 | 70–75 | 500 | 137 | 64,000 | |
| 2 | 300 | 1.08 | 2.8 | 1.4 | 0.33 | 70–75 | 510 | 146 | 135,000 | 0.932 |
| 3 | 300 | 0.54 | 1.4 | 0.7 | 1.5 | 70–75 | 510–560 | 56 | 104,000 | |
| 4 | 300 | 1.08 | 2.8 | 1.4 | 3.0 | 70–75 | 200–310 | 151 | 140,000 | 0.932 |
| 5 | 300 | 1.08 | 2.8 | — | 3.0 | 70–75 | 200–370 | 71 | 66,000 | |
| 6 | 300 | 1.08 | — | 1.4 | 3.0 | 70–75 | 200–380 | 0 | 0 | |
| $Al(i-Bu)_3$ | | | | | | | | | | |
| 7 | 300 | 1.08 | 2.8 | — | 3.0 | 70–75 | 200–330 | 29 | 27,000 | |
| 8 | —$^c$ | 1.08 | 2.8$^d$ | 1.4 | 1.5 | 70–75 | 200–310 | 126 | 117,000 | 0.952 |

$^a$Catalyst = $MgCl_2$/Ethyl Benzoate/$SiCl_4$/$TiCl_4$ (Ti = 1.5%)
$^b$Ethylene + Refinery $C_4$
$^c$300 g n-hexane
$^d$$AlEt_2Cl$ Analysis of Refinery $C_4$

| Component | % |
|---|---|
| 1-Butene | 15.71 |
| cis-2-Butene | 4.88 |
| trans-2-Butene | 10.14 |
| isobutene | 19.56 |
| butadiene | 0.16 |
| isobutane | 39.87 |
| n-butane | 6.23 |
| higher than $C_4$ | 3.45 |

Polymerizations were carried out in a 1-liter stainless steel autoclave. Before each run, the autoclave was heated to 120° C. for 2 hours and cooled to room temperature in dry, oxygen-free nitrogen. The refinery $C_4$ and n-hexane solvent used were dried over molsieve (Linde 1/16-inch pellets, 4A). Ethylene (99+%) was used as received. All operations were performed under nitrogen.

The supported titanium complex used in this example was prepared according to the procedure described in Chemical Abstracts, 96:69614c (1982). Following this procedure, a mixture of 20 g $MgCl_2$, 12 ml (12.62 g) ethyl benzoate and 3 ml (4.45 g) $SiCl_4$ was ball milled for 80 hours to give a fine powder. An 8-g portion of the above powder was mixed with 400 ml 1,2-dichloroethane and 40 ml $TiCl_4$ and heated at 80°–85° C. for 2 hours under nitrogen. The resulting complex was filtered, washed with n-hexane and dried in a nitrogen stream to give 5.9 g of catalyst containing 1.5 wt. % Ti.

For this example, the autoclave was charged with 50 g n-hexane, 5.6 mM $AlEt_2Cl$ (25% solution in toluene), 2.8 mM $MgBu_2$ (0.71 molar in n-heptane) and 0.144 g of an $MgCl_2$/ethyl benzoate/$SiCl_4$/$TiCl_4$ (Ti=1.5%) catalyst (2.16 mg Ti; 0.045 mM Ti), prepared as described above, and 300 g refinery $C_4$. The autoclave was heated to 70° C. and ethylene was added to bring the autoclave pressure to 500 psi. An exothermic reaction occurred and the temperature was maintained at 70° to 75° C. by cooling with an internal water coil. After 0.33 hours, the autoclave was vented and the product was dried in vacuum at 70° C. to 80° C. The polymer yield was 137 g, corresponding to 64,000 g LLDPE/g Ti.

EXAMPLES 2-8

These examples were carried out following the procedure of Example 1 and the results are tabulated in Table 1. Example 7 is a comparative example using a trialkyl aluminum cocatalyst. Example 8 is a comparative example showing the formation of high density polyethylene in the absence of refinery $C_4$.

What is claimed is:

1. A process for the preparation of linear low density polyethylene by the copolymerization of ethylene and 1-butene which comprises contacting ethylene with a feedstock comprising 1-butene in the presence of a catalyst comprising:
   (a) a solid supported titanium tetrahalide complex, wherein said complex is prepared by contacting a mechanically pulverized solid support with titanium tetrahalide in the absence of mechanical pulverization, and
   (b) a cocatalyst comprising a mixture of a dialkyl aluminum halide and a dialkyl magnesium or alkyl lithium compound.

2. The process according to claim 1, wherein the feedstock comprises about 5% to about 100% 1-butene.

3. The process according to claim 1, wherein the feedstock is a refinery $C_4$ hydrocarbon stream.

4. The process according to claim 3, wherein the refinery $C_4$ hydrocarbon stream comprises about 5 to 25% 1-butene.

5. The process according to claim 1, wherein the contacting is carried out at a temperature in the range of about 0° C. to 100° C. and a pressure in the range of about 10 to 2000 psi.

6. The process according to claim 1, wherein the dialkyl aluminum halide is a dialkyl aluminum chloride.

7. The process according to claim 6, wherein the dialkyl aluminum chloride is diethyl aluminum chloride.

8. The process according to claim 1, wherein the dialkyl magnesium compound is dibutyl magnesium.

9. The process according to claim 1, wherein the alkyl lithium compound is butyl lithium.

10. The process according to claim 1, wherein the molar ratio of aluminum to magnesium or aluminum to lithium is 1:5 to 5:1.

11. The process according to claim 1, wherein the mechanically pulverized solid support comprises a magnesium dihalide, an aromatic carboxylic acid ester and an alcohol or phenol.

12. The process according to claim 1, wherein the mechanically pulverized solid support comprises a magnesium dihalide, an aromatic carboxylic acid ester and silicon tetrachloride.

13. The process according to claim 11, wherein the titanium tetrahalide is titanium tetrachloride and the mechanically pulverized solid support comprises magnesium dichloride, ethyl benzoate and ethanol.

14. The process according to claim 11, wherein the titanium tetrahalide is titanium tetrachloride and the mechanically pulverized solid support comprises magnesium dichloride, ethyl benzoate and cresol.

15. The process according to claim 12, wherein the titanium tetrahalide is titanium tetrachloride and the mechanically pulverized solid support comprises magnesium dichloride, ethyl benzoate and silicon tetrachloride.

* * * * *